US008792502B2

(12) United States Patent
Rajamanickam et al.

(10) Patent No.: US 8,792,502 B2
(45) Date of Patent: Jul. 29, 2014

(54) DUPLICATE MAC ADDRESS DETECTION

(75) Inventors: Supriya Rajamanickam, Bangalore (IN); Sudarshana Kandachar Sridhara Rao, Bangalore (IN); Rajasekhar Manam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 13/568,162

(22) Filed: Aug. 7, 2012

(65) Prior Publication Data

US 2014/0044134 A1     Feb. 13, 2014

(51) Int. Cl.
H04L 12/28 (2006.01)

(52) U.S. Cl.
USPC ...................................... 370/395.54; 709/222

(58) Field of Classification Search
USPC .............................. 709/222, 245; 370/395.54
See application file for complete search history.

(56) References Cited

U.S. PATENT DOCUMENTS

| | | | | |
|---|---|---|---|---|
| 5,892,912 A * | 4/1999 | Suzuki et al. | | 370/395.53 |
| 8,401,024 B2 * | 3/2013 | Christensen et al. | | 370/395.53 |
| 8,601,159 B2 * | 12/2013 | Brown et al. | | 709/245 |
| 2009/0125615 A1 * | 5/2009 | Murray et al. | | 709/221 |
| 2011/0022695 A1 * | 1/2011 | Dalal et al. | | 709/222 |
| 2011/0194563 A1 * | 8/2011 | Shen et al. | | 370/395.52 |
| 2012/0291028 A1 * | 11/2012 | Kidambi et al. | | 718/1 |

\* cited by examiner

*Primary Examiner* — Kenny Lin
(74) *Attorney, Agent, or Firm* — Schwegman Lundberg & Woessner, P.A.

(57) ABSTRACT

Various systems and methods for detecting media access control (MAC) address conflicts are described herein. An indication to create a virtual machine on the host device is received at a host device of a plurality of host devices. A MAC address to assign to the virtual machine is identified, and a message is transmitted to at least one of the plurality of host devices, with the message including the identified MAC address. The MAC address is assigned to the virtual machine in the absence of a response from the at least one of the plurality of host devices indicating a potential conflict with the MAC address.

21 Claims, 3 Drawing Sheets

DUPLICATE MAC ADDRESS DETECTION

TECHNICAL FIELD

The present disclosure relates generally to computer networking and in particular to detecting duplicate media access control (MAC) addresses.

BACKGROUND

A MAC address is a unique identifier assigned to a network interface at the physical network layer. In physical devices, a MAC address is typically assigned by a manufacturer and stored in read-only memory (ROM). In virtual devices, a MAC address is assigned when the virtual machine (VM) is instantiated. In the case of a single hypervisor managing virtual machines, MAC address conflicts are less likely to arise because the hypervisor has control over the allocation of the MAC addresses. However, when several hypervisors are deployed in the network to instantiate and manage virtual machines, MAC address conflicts may arise. Therefore, there is a need to reduce or eliminate MAC address conflicts across multiple hypervisors.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

As content management transitions to an online, centralized model (e.g., cloud computing), data center infrastructure becomes more complex. Large data centers may include multiple hypervisors with virtual switching and network management components. VMs are created and run on hypervisors. Typically, these VMs contain virtual components such as a virtual central processing unit (CPU), memory, hard disk, network interface card (NIC), and the like. Virtual NICs are associated with virtual switches for packet routing. The virtual switch functionality is available as part of the hypervisors or provided by partners. For example, the Cisco® Nexus 1000V runs on multiple hypervisors and provides a virtual switching mechanism. As an analogue to physical NICs, virtual NICs each have a MAC assigned by a hypervisor or, in some cases, by a server administrator.

Regardless of how a MAC address is assigned to a virtual NIC, there exists a possibility of having a MAC address conflict between two or more virtual NICs in a data center. For example, when MAC addresses are statically assigned by a server administrator, two or more VMs and the virtual NICs of the VMs may be assigned the same MAC address. This may be due to poor record keeping or miscommunication between several administrators.

Additionally, MAC addresses may be dynamically assigned by a hypervisor. In some implementations, a function is used to generate the MAC addresses. When several hypervisors are used, two hypervisors may inadvertently obtain the same MAC address. For example, a virtualization server may have a server instance identifier that is randomly generated at installation time. Though unlikely, multiple instances of the virtualization server may acquire the same server instance identifier. The server instance identifier is used to generate MAC addresses and thus, the virtualization servers with the same server instance identifiers may end up generating identical MAC addresses. This problem is more likely when cloning servers.

Further, some data centers may use a combination of statically and dynamically generated MAC addresses. In such an environment, it is not difficult to imagine a situation where a MAC conflict may arise.

What is needed then is a mechanism to detect duplicate MAC addresses. Examples of such mechanisms are illustrated and discussed in general in FIGS. 1-4, and with specific instances in FIGS. 5-9.

Figure 1:
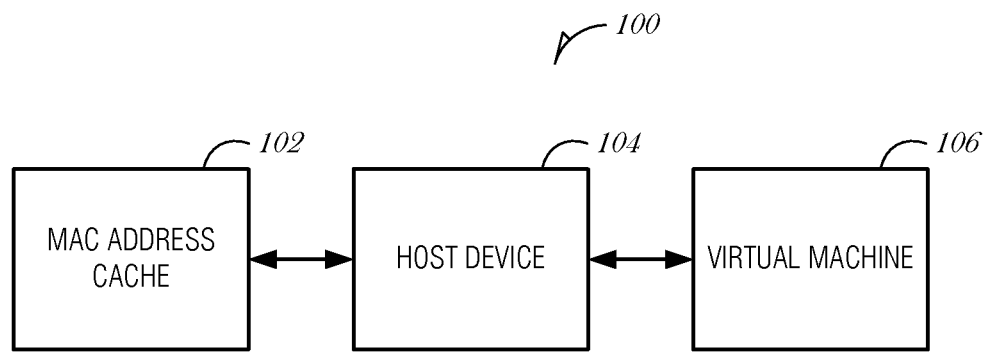
FIG. 1 is a block diagram illustrating a system, according to an embodiment.

FIG. 1 is a block diagram illustrating a system 100, according to an embodiment. The system 100 includes a MAC address cache 102, a host device 104, and a virtual machine 106. The MAC address cache 102 may be implemented in various ways, such as with a reserved address range, a list of MAC addresses, or a function to generate a MAC address. The host device 104 includes a hypervisor to manage one or more VMs. The virtual machine 106 may be implemented with software emulation or hardware virtualization, or a combination of emulation and virtualization.

When instructed to create or instantiate a virtual machine 106, the host device 104 accesses the MAC address cache 102 to identify or generate a MAC address for the virtual machine 106. In order to reduce or eliminate MAC address conflicts, the host device 104 transmits a message to other host devices on the network (not shown). If, after a timeout period, the host device 104 does not receive any messages from other host devices on the network indicating a conflict with the MAC address, the host device 104 assigns the MAC address to the virtual machine 106. At this time, the host device 104 may proceed with conventional post-assignment routines, such as using an address resolution protocol (ARP) message to advertise or announce the assigned MAC address so that other host devices can update their ARP caches (e.g., via a gratuitous ARP message).

In an embodiment, the host device 104 transmits a broadcast message to the other host devices on the network. The broadcast message may be a modified wake-on-LAN (WOL) message. Using a WOL message may be advantageous because WOL messages are only flooded to switch ports, and not forwarded to individual VMs, thereby reducing visibility of MAC addresses to other VMs running in the network and increasing network security.

Figure 2:
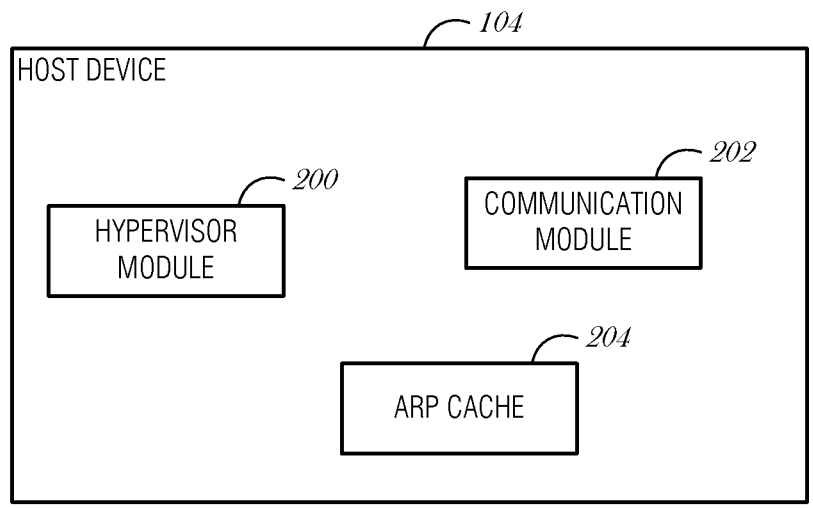
FIG. 2 is a block diagram illustrating modules of a host device, according to an embodiment.

FIG. 2 is a block diagram illustrating modules of a host device 104, according to an embodiment. As shown in FIG. 2, there is a hypervisor module 200 and a communication module 202. The hypervisor module 200 may be configured to receive an indication to assign a MAC address to a VM under control of the hypervisor module 200. The hypervisor module 200 then identifies a candidate MAC address to assign to the VM. The communication module 202 transmits a message to at least one other hypervisor module in another host device (not shown), where the message includes the candidate MAC address. After a timeout period, in the absence of a response from the at least one other hypervisor module indicating a potential conflict with the candidate MAC address, the hypervisor module 200 assigns the candidate MAC address to the VM. In addition, the modules 200 and 202 may be configured to perform the operations discussed in the flowcharts below.

FIG. 2 can also be used to discuss the other host devices on the network. For example, when a host device 104 receives a message with a MAC address from another host device, the message may be received at the communication module 202. The hypervisor module 200 may then act on the message by consulting memory accessible by hypervisor module 200 (e.g., internal memory) or an ARP cache 204 (or equivalent for a virtualization server). If there is no apparent conflict with the advertised MAC address, the host device 104 does not respond. However, if there is an apparent conflict, then the host device 104 creates and transmits a responsive message. In an embodiment, the responsive message is unicast to the advertising host device.

Figure 3:
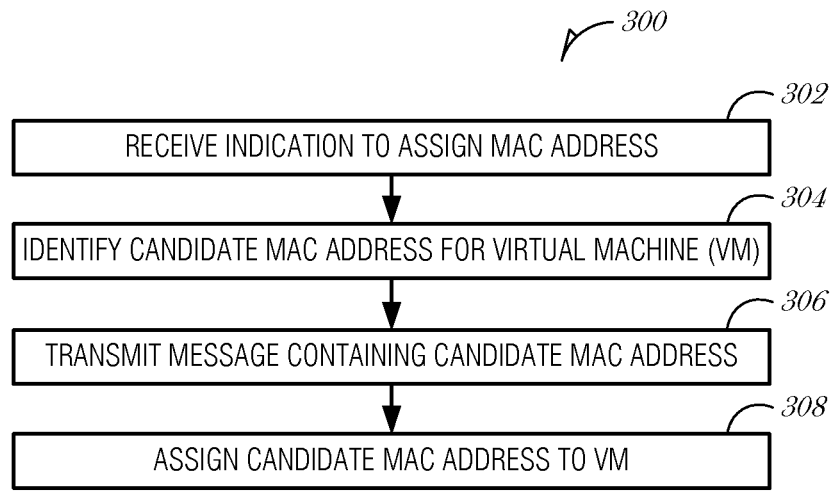
FIG. 3 is a flowchart illustrating a general form of a mechanism for transaction-based shared memory protection, according to an embodiment.

FIG. 3 is a flowchart illustrating a method 300 for detecting MAC address conflicts, according to an embodiment. At block 302, an indication to assign a MAC address to a virtual machine on a host device is received. The host device may be one of a plurality of host devices on a network. The indication may be received from a user (e.g., server administrator) who may want to assign a MAC address to a VM. Alternatively, the indication may be provided to the host device as part of a process to create a VM.

At block 304, a candidate MAC address to assign to the VM is identified. The candidate MAC address may be chosen from a pool of addresses or from a range of addresses. For example, Microsoft® implements Hyper-V™ Server, which is a hypervisor-based server virtualization product. Hyper-V™ Server allocates dynamic MAC addresses from a range of addresses defined by registry values holding the minimum and maximum MAC addresses available for the software. Each Hyper-V™ Server holds 256 addresses and, when asked, gives them out in round robin fashion, keeping track of the last assigned MAC address.

Alternatively, the candidate MAC address may be generated based on a routine. For example, VMware® implements a vCenter™ Server system where each vCenter™ Server has an associated instance identifier (ID). The ID is a number between 0 and 63 that is randomly generated at installation time, but can be reconfigured after installation. A vCenter™ Server uses the instance ID to generate MAC addresses and universally unique identifiers (UUIDs) for VMs.

At block 306, a message is transmitted to at least one of the plurality of host devices, with the message including the candidate MAC address. In an embodiment, the message is transmitted using a layer-2 message. Layer-2 refers to the Open System Interconnection (OSI) model and, in particular, the data link layer in the OSI model. In an embodiment, a WOL message is transmitted. A WOL is implemented using a special network message called a magic packet. The magic packet contains the MAC address of the destination computer. In conventional use, a listening computer waits for a magic packet addressed to it and then initiates system wake-up. For the purposes of detecting duplicate MAC addresses, the WOL message may be modified. Thus, in an embodiment, the WOL message includes a modified magic packet that has the source MAC field set to the candidate MAC address and the target MAC field set to the broadcast address.

In an alternative embodiment, a Link Layer Discovery Protocol (LLDP) message is transmitted. The LLDP is a vendor-neutral link layer protocol in the Internet Protocol Suite used by network devices for advertising their identity, capabilities, and neighbors on an IEEE 802 local area network. The protocol is formally referred to by the IEEE as "Station and Media Access Control Connectivity Discovery" as specified in standards document IEEE 802.1AB. LLDP information is sent at fixed intervals from devices using Ethernet frames. Each frame contains one LLDP Data Unit (LLDPDU), which is a sequence of type-length-value (TLV) structures. Thus, in an embodiment, a new TLV is included in an LLDPDU and used to advertise the candidate MAC address.

In an embodiment, a message is broadcasted to the plurality of host devices, where the candidate MAC address is encapsulated in a TLV structure in the message. The message may be broadcasted over a layer-2 or layer-3 protocol.

At block 308, the candidate MAC address is assigned to the VM in the absence of a response from the at least one of the plurality of host devices indicating a potential conflict with the candidate MAC address. In an embodiment, a timeout interval is used. The timeout interval may be configurable, such as by an administrative user.

In another embodiment, a response is received from one of the plurality of host devices, with the response indicating MAC address conflict. An administrative user is notified of the MAC address conflict. In the case of a MAC address conflict, an alternative MAC address to assign to the VM is identified, and a second message is transmitted to at least one of the plurality of host devices. The second message includes the identified alternative MAC address. This iterative process may be performed multiple times in order to identify and assign a MAC address that is clear of conflicts.

Figure 4:
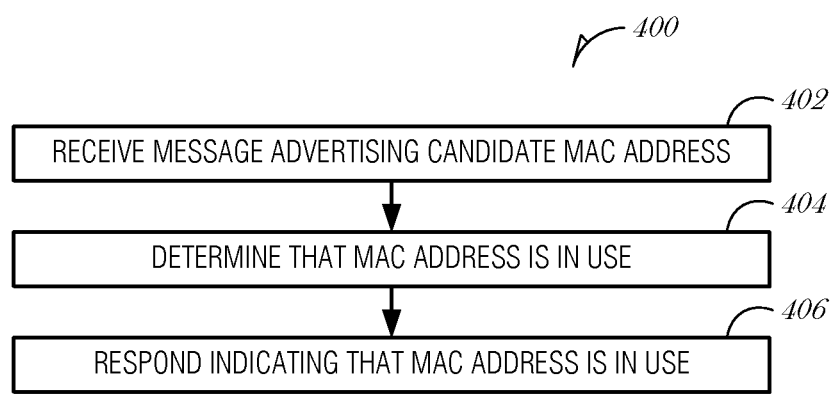
FIG. 4 is a flowchart illustrating a method for checking the availability of a MAC address, according to an embodiment.

FIG. 4 is a flowchart illustrating a method 400 for checking the availability of a MAC address, according to an embodiment. At block 402, a message is received at a host device, where the message is advertising a candidate MAC address that another host device is considering using or assigning to a VM managed at the other host device. The message may be a modified WOL message in an embodiment. In another embodiment, the message may be a modified LLDP message.

At block 404, the receiving host device determines that the candidate MAC address is in use. For example, the receiving host device may refer to tables, memory, or databases that store currently allocated MAC addresses for VMs at the receiving host device.

At block 406, the receiving host device responds indicating that the candidate MAC address is in use. The response may be unicast to the original sending host device. In an embodiment, the response may be a unicast WOL message specifically formatted to indicate that the candidate MAC address is already in use. For example, the response message may be a WOL message with the receiving host device's MAC address as the source address, the original sending host device's MAC address as the target address, and the payload of the WOL message being the candidate MAC address.

Figure 5:
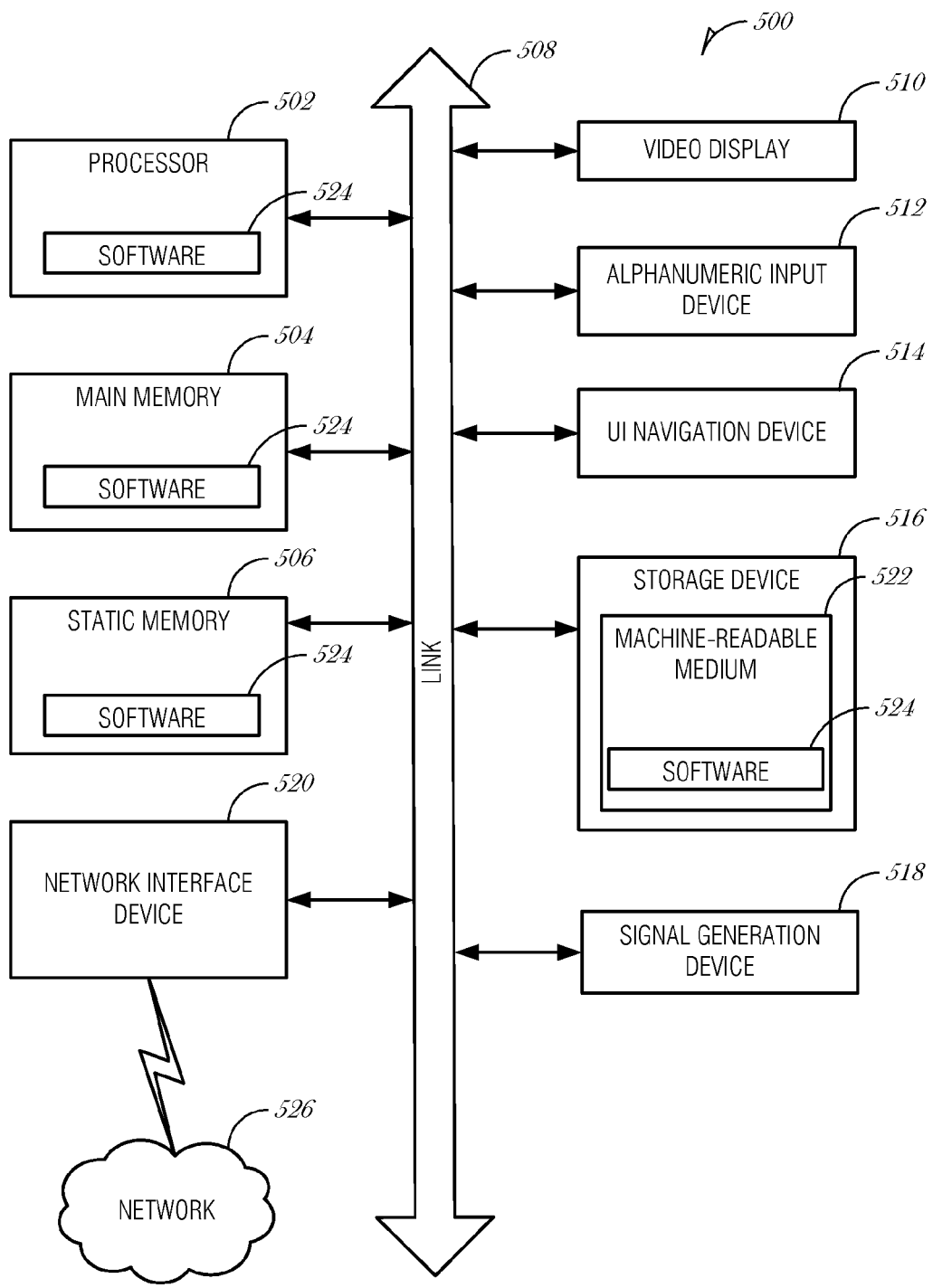
FIG. 5 is a block diagram illustrating a machine in the example form of a computer system, within which a set or sequence of instructions may be executed to cause the machine to perform any one of the methodologies discussed herein, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, alphanumeric input device 512, and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although embodiments have been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

Examples, as described herein, can include, or can operate on, logic or a number of components, modules, or mechanisms. Modules are tangible entities (e.g., hardware) capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A non-transitory machine-readable medium comprising instructions for detecting media access control (MAC) address conflicts, the instructions when executed on a computing device, cause the computing device to:
   receive at a host device of a plurality of host devices, an indication to assign a MAC address to a virtual machine on the host device;

identify a candidate MAC address to assign to the virtual machine;

transmit a message to at least one of the plurality of host devices, the message including the candidate MAC address; and assign the candidate MAC address to the virtual machine in the absence of a response from the at least one of the plurality of host devices indicating a potential conflict with the candidate MAC address.

2. The non-transitory machine-readable medium of claim 1, wherein the instructions to transmit the message comprise instructions to transmit a layer-2 message.

3. The non-transitory machine-readable medium of claim 2, wherein the instructions to transmit the layer-2 message comprise instructions to transmit a wake-on-LAN message.

4. The non-transitory machine-readable medium of claim 2, wherein the instructions to transmit the layer-2 message comprise instructions to transmit a Link Layer Discovery Protocol (LLDP) message.

5. The non-transitory machine-readable medium of claim 1, wherein the instructions to transmit the message comprise instructions to broadcast a message to the plurality of host devices; and wherein the candidate MAC address is encapsulated in a type-length-value (TLV) structure in the message.

6. The non-transitory machine-readable medium of claim 1 comprising instructions to:

receive a response from one of the plurality of host devices, the response indicating MAC address conflict; and notify an administrative user of the MAC address conflict.

7. The non-transitory machine-readable medium of claim 6, comprising instructions to:

identify an alternative MAC address to assign to the virtual machine; and transmit a second message to at least one of the plurality of host devices, the second message including the identified alternative MAC address.

8. A method for detecting media access control (MAC) address conflicts, the method comprising:

receiving at a host device of a plurality of host devices, an indication to assign a MAC address to a virtual machine on the host device;

identifying a candidate MAC address to assign to the virtual machine;

transmitting a message to at least one of the plurality of host devices, the message including the candidate MAC address; and assigning the candidate MAC address to the virtual machine in the absence of a response from the at least one of the plurality of host devices indicating a potential conflict with the candidate MAC address.

9. The method of claim 8, wherein transmitting the message comprises transmitting a layer-2 message.

10. The method of claim 9, wherein transmitting the layer-2 message comprises transmitting a wake-on-LAN message.

11. The method of claim 9, wherein transmitting the layer-2 message comprises transmitting a Link Layer Discovery Protocol (LLDP) message.

12. The method of claim 8, wherein transmitting the message comprises broadcasting a message to the plurality of host devices; and wherein the candidate MAC address is encapsulated in a type-length-value (TLV) structure in the message.

13. The method of claim 8, comprising:

receiving a response from one of the plurality of host devices, the response indicating MAC address conflict; and notifying an administrative user of the MAC address conflict.

14. The method of claim 13, comprising:

identifying an alternative MAC address to assign to the virtual machine; and transmitting a second message to at least one of the plurality of host devices, the second message including the identified alternative MAC address.

15. A computing system configured for detecting media access control (MAC) address conflicts, the computing system comprising:

a computing processor; and a memory to hold instructions, which when executed by the computing processor, cause the computing processor to:

receive at a host device of a plurality of host devices, an indication to assign a MAC address to a virtual machine on the host device;

identify a candidate MAC address to assign to the virtual machine;

transmit a message to at least one of the plurality of host devices, the message including the candidate MAC address; and assign the candidate MAC address to the virtual machine in the absence of a response from the at least one of the plurality of host devices indicating a potential conflict with the candidate MAC address.

16. The computing system of claim 15, wherein the instructions to transmit the message comprise instructions to transmit a layer-2 message.

17. The computing system of claim 16, wherein the instructions to transmit the layer-2 message comprise instructions to transmit a wake-on-LAN message.

18. The computing system of claim 16, wherein the instructions to transmit the layer-2 message comprise instructions to transmit a Link Layer Discovery Protocol (LLDP) message.

19. The computing system of claim 15, wherein the instructions to transmit the message comprise instructions to broadcast a message to the plurality of host devices; and wherein the candidate MAC address is encapsulated in a type-length-value (TLV) structure in the message.

20. The computing system of claim 15, comprising instructions to:

receive a response from one of the plurality of host devices, the response indicating MAC address conflict; and notify an administrative user of the MAC address conflict.

21. The computing system of claim 20, comprising instructions to:

identify an alternative MAC address to assign to the virtual machine; and transmit a second message to at least one of the plurality of host devices, the second message including the identified alternative MAC address.

* * * * *